(12) United States Patent
Wang (10) Patent No.: US 9,091,340 B2
(45) Date of Patent: Jul. 28, 2015

(54) LATCHING SHIFTER WITH OVERRIDE FEATURE

(75) Inventor: Orson S. Wang, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 260 days.

(21) Appl. No.: 13/105,039

(22) Filed: May 11, 2011

(65) Prior Publication Data

US 2012/0285284 A1    Nov. 15, 2012

(51) Int. Cl.
| | |
|---|---|
| *F16H 29/10* | (2006.01) |
| *F16H 59/10* | (2006.01) |
| *F16H 61/24* | (2006.01) |
| *F16H 59/02* | (2006.01) |

(52) U.S. Cl.
CPC .............. *F16H 59/10* (2013.01); *F16H 61/24* (2013.01); *F16H 2059/0295* (2013.01); *F16H 2061/247* (2013.01); *Y10T 74/2011* (2015.01); *Y10T 74/2014* (2015.01); *Y10T 74/20098* (2015.01); *Y10T 74/20116* (2015.01)

(58) Field of Classification Search
CPC ................ F16H 2059/0295; F16H 2061/247; F16H 59/10; F16H 59/02
USPC ................ 74/473.1, 473.12, 473.18, 473.21, 74/473.23, 473.3
See application file for complete search history.

(56) References Cited

U.S. PATENT DOCUMENTS

| | | | |
|---|---|---|---|
| 2,723,569 A * | 11/1955 | Ferguson et al. ............ 74/473.1 |
| 2,860,522 A * | 11/1958 | Howlett ..................... 74/473.23 |
| 2,933,945 A * | 4/1960 | Brewster et al. ............ 74/473.3 |
| 3,665,775 A * | 5/1972 | Freeman ..................... 74/473.21 |
| 3,863,520 A * | 2/1975 | Moline et al. .............. 74/473.23 |
| 4,191,064 A * | 3/1980 | Houk et al. ................. 74/473.23 |
| 4,473,141 A * | 9/1984 | Mochida .......................... 477/94 |
| 4,512,451 A * | 4/1985 | Kobelt .......................... 477/113 |
| 4,846,322 A * | 7/1989 | Swank ....................... 192/219.4 |
| 5,267,157 A   | 11/1993 | Churchill et al. |
| 5,417,126 A * | 5/1995 | DeCrouppe et al. ......... 74/473.1 |
| 5,448,925 A * | 9/1995 | McFadden ..................... 74/335 |
| 5,489,246 A * | 2/1996 | Moody et al. ................... 477/96 |
| 5,489,264 A   | 2/1996 | Salo |
| 5,493,932 A * | 2/1996 | Plocher ....................... 74/483 R |
| 5,537,885 A * | 7/1996 | Thomas ......................... 74/335 |
| 5,660,079 A * | 8/1997 | Friedrich ................. 74/471 XY |

(Continued)

FOREIGN PATENT DOCUMENTS

| | | |
|---|---|---|
| EP | 1486702 A1 | 12/2004 |
| WO | WO 2005039914 A2 * | 5/2005 |

OTHER PUBLICATIONS

U.S. Appl. No. 13/232,158 to Orson S. Wang, filed Sep. 14, 2011, entitled :Electronic Shifter with Adaptive Position.

(Continued)

*Primary Examiner* — William Kelleher
*Assistant Examiner* — Emily Cheng (57) ABSTRACT

A latching shifter with override feature is interfaced with a shift-by-wire transmission, wherein the latching of the shifter with respect to a gear cam is autonomously synchronized to a gear selected by the electronics of the transmission whenever the shifter is physically at another gear via autonomous actuation of a gear synchronization cam having an inclined cam follower guide surface. The incline urges the cam follower under its inherent biasing into the gear notch corresponding to the gear selected by the electronics of the transmission.

4 Claims, 4 Drawing Sheets

(56) References Cited

U.S. PATENT DOCUMENTS

| | | | |
|---|---|---|---|
| 5,675,315 A | 10/1997 | Issa et al. | |
| 5,682,789 A * | 11/1997 | DeCrouppe et al. | 74/335 |
| 5,785,626 A * | 7/1998 | Osborn et al. | 477/99 |
| 5,829,309 A | 11/1998 | Wagner et al. | |
| 5,861,803 A | 1/1999 | Issa | |
| 5,868,034 A * | 2/1999 | McFadden | 74/335 |
| 5,916,292 A | 6/1999 | Issa et al. | |
| 5,973,593 A | 10/1999 | Botella | |
| 6,059,689 A | 5/2000 | Shimizu et al. | |
| 6,199,003 B1 | 3/2001 | Hollingsworth et al. | |
| 6,209,408 B1 * | 4/2001 | DeJonge et al. | 74/335 |
| 6,295,887 B1 * | 10/2001 | DeJonge et al. | 74/473.3 |
| 6,332,524 B1 * | 12/2001 | Shin | 192/220.2 |
| 6,336,373 B1 * | 1/2002 | Murai et al. | 74/473.23 |
| 6,393,932 B1 * | 5/2002 | Seki et al. | 74/473.12 |
| 6,401,564 B1 | 6/2002 | Lee | |
| 6,422,106 B1 | 7/2002 | Lee | |
| 6,503,170 B1 | 1/2003 | Tabata | |
| 6,658,952 B2 | 12/2003 | Hayashi et al. | |
| 6,684,730 B2 * | 2/2004 | Giefer et al. | 74/473.23 |
| 6,783,480 B2 * | 8/2004 | Masuda et al. | 477/94 |
| 6,835,162 B2 * | 12/2004 | Yamauchi et al. | 477/101 |
| 6,845,684 B2 | 1/2005 | Inaba et al. | |
| 6,848,332 B2 | 2/2005 | Hayashi et al. | |
| 6,918,314 B2 * | 7/2005 | Wang | 74/335 |
| 7,028,575 B2 | 4/2006 | Ehrmaier et al. | |
| 7,107,868 B2 | 9/2006 | Yone | |
| 7,393,304 B2 * | 7/2008 | Wilde et al. | 477/94 |
| 7,406,889 B2 | 8/2008 | Okawa | |
| 7,633,026 B2 | 12/2009 | Zapf et al. | |
| 7,694,602 B2 * | 4/2010 | Nagano et al. | 74/473.12 |
| 7,721,619 B2 * | 5/2010 | Kamei et al. | 74/473.23 |
| 7,723,628 B2 * | 5/2010 | Jarrett | 200/332 |
| 7,770,486 B2 | 8/2010 | Morita et al. | |
| 7,784,375 B2 * | 8/2010 | Bleckmann et al. | 74/473.23 |
| 7,900,532 B2 * | 3/2011 | Abel et al. | 74/473.18 |
| 8,004,275 B2 | 8/2011 | Wang et al. | |
| 8,138,906 B2 | 3/2012 | Wang et al. | |
| 8,186,241 B2 * | 5/2012 | Sickart | 74/473.21 |
| 8,485,061 B2 | 7/2013 | Kliemannel et al. | |
| 8,544,358 B1 | 10/2013 | Giefer et al. | |
| 8,577,567 B2 | 11/2013 | Nakade et al. | |
| 2004/0226801 A1 * | 11/2004 | De Jonge et al. | 192/220.7 |
| 2004/0237693 A1 | 12/2004 | Koide | |
| 2004/0244524 A1 * | 12/2004 | Russell | 74/473.23 |
| 2005/0223834 A1 * | 10/2005 | Otsuka | 74/473.18 |
| 2005/0223835 A1 * | 10/2005 | Wang | 74/473.18 |
| 2006/0053930 A1 * | 3/2006 | Morita et al. | 74/473.18 |
| 2006/0060019 A1 * | 3/2006 | Sato et al. | 74/473.23 |
| 2006/0216675 A1 | 9/2006 | Ruttiger et al. | |
| 2007/0137362 A1 * | 6/2007 | Kortge et al. | 74/473.18 |
| 2007/0234837 A1 * | 10/2007 | Russell | 74/473.12 |
| 2008/0006115 A1 * | 1/2008 | Mitteer | 74/473.21 |
| 2008/0098845 A1 * | 5/2008 | Meyer | 74/473.26 |
| 2008/0142346 A1 | 6/2008 | Zapf et al. | |
| 2009/0048066 A1 * | 2/2009 | Rouleau | 477/156 |
| 2009/0217782 A1 * | 9/2009 | Wang | 74/473.21 |
| 2009/0272216 A1 | 11/2009 | Wilson et al. | |
| 2009/0299585 A1 | 12/2009 | Trush et al. | |
| 2010/0024584 A1 * | 2/2010 | Giefer et al. | 74/473.18 |
| 2010/0071506 A1 * | 3/2010 | Kliemannel et al. | 74/625 |
| 2010/0307276 A1 * | 12/2010 | Giefer et al. | 74/473.3 |
| 2011/0132120 A1 | 6/2011 | Skogward | 74/473.3 |
| 2011/0162475 A1 * | 7/2011 | Rake et al. | 74/473.3 |
| 2012/0285284 A1 * | 11/2012 | Wang | 74/473.3 |
| 2013/0047768 A1 | 2/2013 | Kamoshida et al. | |
| 2013/0061706 A1 * | 3/2013 | Wang | 74/473.15 |

OTHER PUBLICATIONS

Compendium of Automotive manufacturer gear shift products on the market, dated 2002 through 2010, 13 pages.

* cited by examiner

Fig. 12

LATCHING SHIFTER WITH OVERRIDE FEATURE

TECHNICAL FIELD

The present invention relates to shifting of gears of a transmission of a motor vehicle, and more particularly to an override feature of a latching shifter for a shift-by-wire transmission.

BACKGROUND OF THE INVENTION

A shifter provides a driver selectable input to the transmission indicative of which gear of the transmission is desired by the driver. A shifter may be in the form of a linearly movable shift lever, a rotary knob or a push button, and may be momentary (i.e., biased to return to a "null" position after gear selection) or latching (i.e., physically latched so as to remain at the gear selected). Gear selection typically includes the following gears: gear "P" (park gear), gear "R" (reverse gear), gear "N" (neutral gear), and gear "D" (drive gear). Optionally, other gear selections may be available, such as for example gear "L" (low gear), gear "2", (second gear), gear "1" (first gear), etc.

Figure 1:
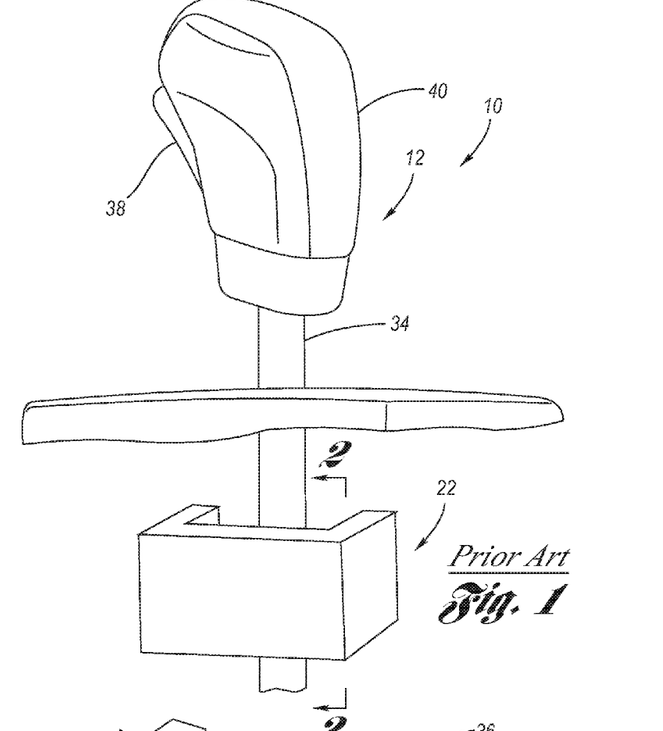
FIG. 1 is a schematic, perspective view of a prior art latching shifter.
Figure 2:
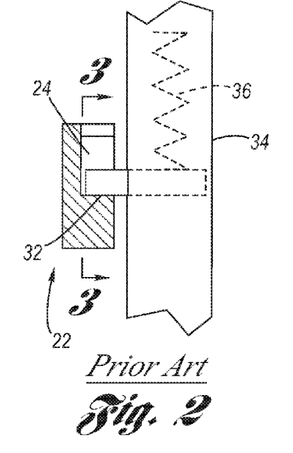
FIG. 2 is a partly sectional view seen along line 2-2 of FIG. 1.
Figure 3:
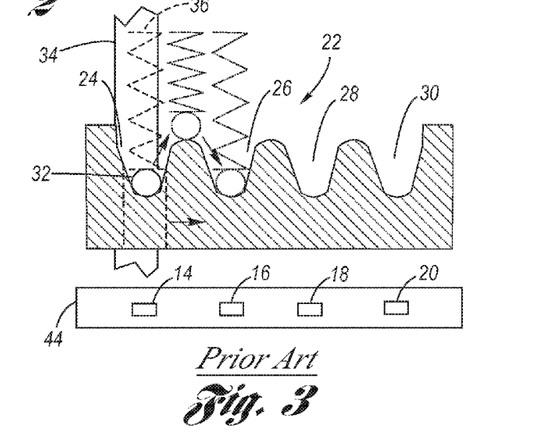
FIG. 3 is a partly sectional view seen along line 3-3 of FIG. 2.

Shown by way of schematic example in FIGS. 1 through 3 is a latching shifter 10 in the form of a shift lever 12. The shift lever 12 is movable to enable driver selection of a gear from a set of various gears of a transmission 44, for example gear "P" (park gear) 14, gear "R" (reverse gear) 16, gear "N" (neutral gear) 18, gear "D" (drive gear) 20, and optionally other gears sequentially after gear "D" (not shown for simplicity). A gear cam 22 has formed therein a series of gear notches, including: a park gear notch 24 corresponding to gear "P" 14, a reverse gear notch 26 corresponding to gear "R" 16, a neutral gear notch 28 corresponding to gear "N" 18, and a drive gear notch 30 corresponding to gear "D" 20. A cam follower 32 is movably connected to a shaft 34 of the shift lever 12 and is biased by a spring 36 disposed within the shaft, wherein the cam follower is biasably received by the gear notch of the selected gear, as shown. A button 38 on the handle 40 of the shift lever 12 is pressed by the driver to shift out of gear "P" (park gear) in electronic association with the driver also placing his/her foot on the brake; wherein the release from/to "P" is effected either mechanically or electronically, as for example described in U.S. Pat. No. 5,489,264, issued on Feb. 6, 1996. As shown at FIG. 3, the cam follower 32 seats into each gear notch, and thereupon defines the gear selected. In order to change gears, the cam follower needs to be moved against its biasing out of the gear notch it is in so that the shift lever can move to another selected gear.

In mechanical transmissions, the interface between the shifter and the gears of the transmission is mechanical, so the gear selected by the driver via movement of the shifter is necessarily the same gear the transmission is in.

However, in shift-by-wire transmissions, the interface between the shifter and the gears of the transmission are electronic, so it is possible for the shifter to be at one gear, while, in fact, the electronics of the transmission, for various reasons related to the vehicle operation and programming, has placed the transmission in another gear than that of the shifter. In such a circumstance, the driver may erroneously infer the transmission is in his/her selected gear, as indicated by the physical position of the shifter, yet, in fact, the electronics of the transmission has electronically shifted to another gear.

The electronic interface of the shifter for a shift-by-wire transmission is accomplished in the prior art utilizing numerous techniques which provide electronic sensing of the position of the shifter so that the electronics are aware of the gear selection by the diver, as for example utilizing a plurality hall switches or a plurality analog sensors with varying gains (as is common with respect to throttle pedal sensors).

Most prior art shift-by-wire transmission shifters are momentary in order to accommodate numerous overrides that may occur in such transmissions. For example, while driving forward at high speed, a driver's shifter selection of gear "R" may result in the electronics of the transmission selecting, instead, gear "N". Similarly in the prior art, it is known to provide a convenience feature whereby, in a situation where the vehicle is at rest and driver has shifted to gear "D", if the driver now turns off the engine, then the electronics of the transmission will automatically select gear "P" before the engine actually turns off Momentary shifters are compatible with such overrides since the shifter is normally in a "null" position.

However, a problem is presented for shift-by-wire transmissions if a latching shifter is to be used, since a potential conflict may arise in a situation where the shifter's gear selection does not physically match the gear selected by the electronics of the shift-by-wire transmission. In the example above in which a driver turns the engine off while the gear selected by the shifter is gear "D", and the electronics of the transmission then electronically selects the gear "P", the problem arises that the latching shifter will remain physically in the gear "D". Not only would this cause confusion to the driver, but it presents a problem as to what the driver should do at the commencement of the next engine ignition cycle. The driver may want to shift from gear "P" to gear "D", but the shifter is already in gear "D"! The solution might be to require the driver to first move the shifter back to gear "P" and then to gear "D", but that would negate the potential convenience that was originally intended.

Consider next the situation in which a motor vehicle spins out of control and begins travelling backward at high speed. In a mechanical transmission, this situation would result in an engine stall. But, in a shift-by-wire transmission, the electronics of the transmission would attempt to shift the transmission to gear "N" in order to avoid an engine stall. However, this autonomous electronic shifting presents a potential problem with latching shifters, since although the transmission is actually in gear "N", the shifter remains physically in gear "D". In such a situation what happens next is a question. If the driver wants to reselect gear "D", he/she is left with the confusion of the shifter already being in gear "D"! One potential "solution" could be to require the driver to first move the shift lever to gear "N" and then back to gear "D", but this is still confusing.

Other potential operational circumstances of a motor vehicle can occur whereby the shift-by-wire transmission electronically determines that one or more of its gears is unavailable for selection by the driver, according to the programming of the electronics. For example, the electronics of the transmission may determine that either the gear "P" or the gear "D" has malfunctioned. In the situation in which the electronics of the transmission determines that the gear "P" is malfunctioning, then the driver may nevertheless select gear "P" by moving the shifter to select gear "P", and believe the transmission is in park when, in fact, it is not.

In the prior art, Jaguar Cars Ltd. of Coventry, England (hereafter simply Jaguar) has addressed some of these latching shift lever concerns. The Jaguar shifter utilizes a motor to move the shifter, in the form of a knob, back to the gear "P" selection, although the motor is not designed to move the shifter to an intermediate position or to move to any other position. In fact, the motor's only capability is to address the operational scenario in which the engine is turned off while the shifter is physically in gear "D" or gear "R", but the electronics of the transmission has selected gear "P". Jaguar also has utilized a lockout mechanism, wherein in certain circumstances of operation, for example, the shifter may be permitted to move from gear "D" to gear "N", but thereupon the shifter is locked in place at gear "N". Note that the Jaguar latching shifter does not address the operational circumstance in which the electronics of the transmission has selected gear "N", yet the shifter is, in fact, physically at gear "D". In this regard, Jaguar simply indicates this untoward condition by a flashing "D" that is viewable by the driver, and meant to convey information to the driver that the transmission is actually in gear "N", not gear "D".

Accordingly, it is a significant challenge to motor vehicle engineering to mate a latching shifter with a shift-by-wire transmission, and yet somehow provide autonomous movement of the shifter into an electronically selected gear from a physically selected gear so as to resolve gear selection conflicts, provide appropriate feedback to the driver of the gear selection status, address concerns regarding pinching and/or crushing of anything that might be in the path of such an autonomous shifter movement, and provide indication of any operative malfunction.

SUMMARY OF THE INVENTION

The present invention is a latching shifter mated with a shift-by-wire transmission, wherein autonomous movement of the shifter from the gear notch of a physically selected gear into the gear notch of an electronically selected gear that is different from the physically selected gear is provided so as to resolve gear selection conflicts, provide appropriate feedback to the driver of the gear selection status, address concerns regarding pinching and/or crushing of anything that might be in the path of such an autonomous shifter movement, and provide indication of any operative malfunction.

The latching shifter with override feature according to the present invention is interfaced with a shift-by-wire transmission, wherein the latching of the shifter, preferably a shift lever, with respect to a gear cam is autonomously synchronized to a gear selected by the electronics of the transmission whenever the shifter is physically at another gear, via autonomous actuation of a gear synchronization cam, which directs the inherent biasing of the cam follower of the shifter so that the shifter is thereby biasably urged into the gear selected by the electronics of the transmission.

According to a first aspect of the present invention, in a situation in which the driver has selected any gear other than gear "P" (park gear), as for example gear "R" (reverse gear), gear "N" (neutral gear), gear "D" (drive gear), gear "L" (low gear), etc. and the electronics of the transmission, according to its programming, has in fact selected gear "P", then a park gear synchronization cam will be autonomously actuated to a deployed state from a retracted state, whereby at the deployed state a cam follower guide surface abuts the cam follower and, against the cam follower biasing, lifts the cam follower from the gear notch of the gear it is currently in. The cam follower guide surface has an incline and raised position relative to the various gear notches except the park gear notch of gear "P" (to which the incline has a lowered position), such that the cam follower, under its inherent biasing, slides along the cam follower guide surface. The cam follower guide surface extends across all gear notches except the park gear notch of gear "P", and is inclined with respect to the cam follower biasing toward the park gear notch of gear "P". Accordingly, no matter what gear was selected by the driver, the cam follower will slide along the cam follower guide surface, physically moving the shifter, so that the cam follower biasingly falls into the park gear notch of gear "P".

According to a second aspect of the present invention, in a situation in which the driver has selected any gear other than gear "N" (neutral gear), as for example gear "P" (park gear), gear "R" (reverse gear), gear "D" (drive gear), gear "L" (low gear), etc. and the electronics of the transmission, according to its programming, has in fact selected gear "N", then a neutral gear synchronization cam will be autonomously actuated to a deployed state from a retracted state, whereby at the deployed state a cam follower guide surface abuts the cam follower and, against the cam follower biasing, lifts the cam follower from the gear notch of the gear it is currently in. The cam follower guide surface has a pair of inclines, each incline having a raised position relative to the various gear notches except the neutral gear notch of gear "N" (to which each incline has a lowered position), such that the cam follower, under its inherent biasing, slides along the cam follower guide surface. The cam follower guide surface extends across all gear notches except the neutral gear notch of gear "N", and is inclined with respect to the cam follower biasing toward the neutral gear notch of gear "N". Accordingly, no matter what gear was selected by the driver, the cam follower will slide along cam follower guide surface, physically moving the shifter, so that the cam follower biasingly falls into the neutral gear notch of gear "N".

In either aspect of the present invention, because the gear synchronization cams are autonomously actuated whenever the driver selected gear does not match the gear selected by the electronics of the transmission, the physical position of the shifter will always by synchronized to the gear the transmission is in. Since the shifter is autonomously placed into the gear selected by the electronics of the transmission, any gear selection confusion is avoided. Additionally, because the movement of the shifter when it is being gear synchronized occurs because of spring biasing, untoward abutment (i.e., pinching, bending, crushing, breaking, etc.) of articles adjacent the shifter is avoided. Lastly, the autonomous actuation of the gear synchronization cams are electronically monitored by a fault detection system and any detected fault is electronically signaled. Accordingly, any potential conflicts between the gear selected by the electronics of the transmission and the gear selection physically made by the shifter are resolved.

Accordingly, it is an object of the present invention to provide a latching shifter mated with a shift-by-wire transmission, wherein autonomous movement of the shifter into an electronically selected gear from a physically selected gear is provided so as to resolve gear selection conflicts, provide appropriate feedback to the driver of the gear selection status, address concerns regarding pinching and/or crushing of anything that might be in the path of such an autonomous shifter movement, and provide indication of any operative malfunction.

This and additional objects, features and advantages of the present invention will become clearer from the following specification of a preferred embodiment.

DESCRIPTION OF THE PREFERRED EMBODIMENT

Referring now to the Drawing, FIGS. 4 through 12 depict various aspects of a motor vehicle shifter with override feature adapted for operation with respect to a shift-by-wire transmission, wherein conventional components of FIGS. 1 through 3 retain the same numbering and are descriptively the same.

Figure 12:
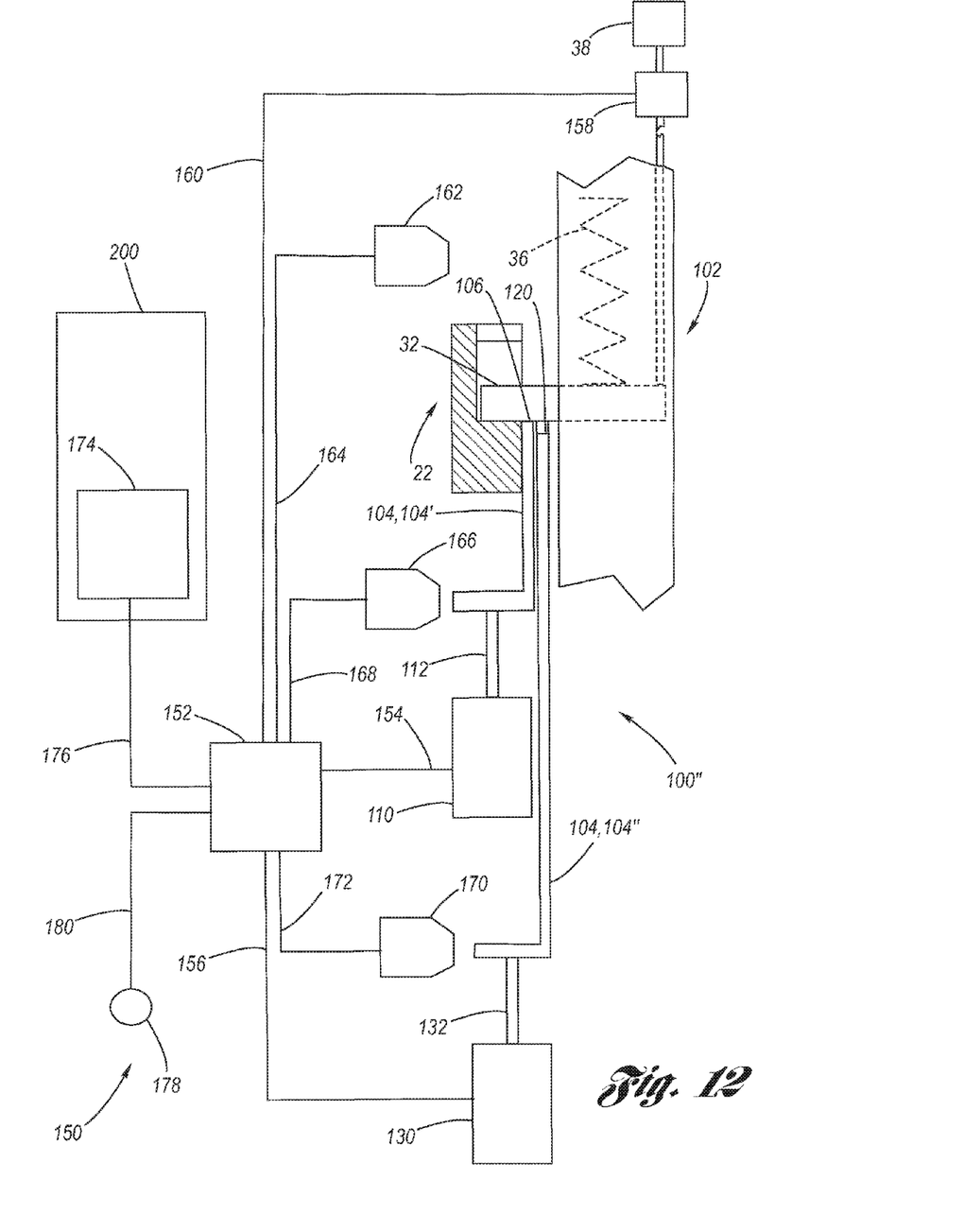
FIG. 12 is a schematic, partly sectional view of a latching shifter with override feature according to both the first and second aspects of the present invention, wherein both the park and neutral gear synchronization cams are shown at their retracted state.

The latching shifter with override feature 100, 100', 100" is interfaced with a shift-by-wire transmission 200 (see FIG. 12). The shifter 102, is generally similar to shift lever 12 shown by way of example in FIG. 1, wherein a cam follower 32 is biased by a spring 36 into a plurality of gear notches of a gear cam 22, including: a park gear notch 24 corresponding to gear "P" (park gear) 14, a reverse gear notch 26 corresponding to gear "R" (reverse gear) 16, a neutral gear notch 28 corresponding to gear "N" (neutral gear) 18, and a drive gear notch 30 corresponding to gear "D" (drive gear) 20, and which may include additional gears as described hereinabove. In accordance with the present invention, however, the shifter 102 is autonomously synchronized to the gear selected by the electronics of the transmission whenever the shifter is physically at another gear via autonomous actuation of a gear synchronization cam 104 which directs the inherent biasing of the cam follower 32 so that the shifter is biasably urged into the gear notch corresponding to the gear selected by the electronics of the transmission.

Figures 4, 5:
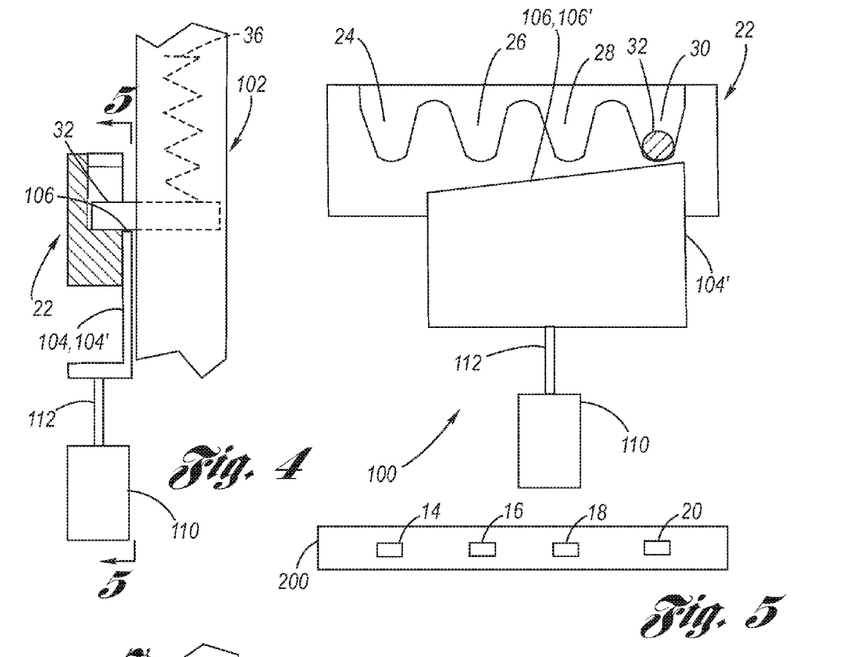
FIG. 4 is a schematic, partly sectional view of a latching shifter with override feature according to a first aspect of the present invention, wherein the park gear synchronizion cam is shown at its retracted state.
FIG. 5 is a partly sectional view seen along line 5-5 of FIG. 4.
Figures 6, 7:
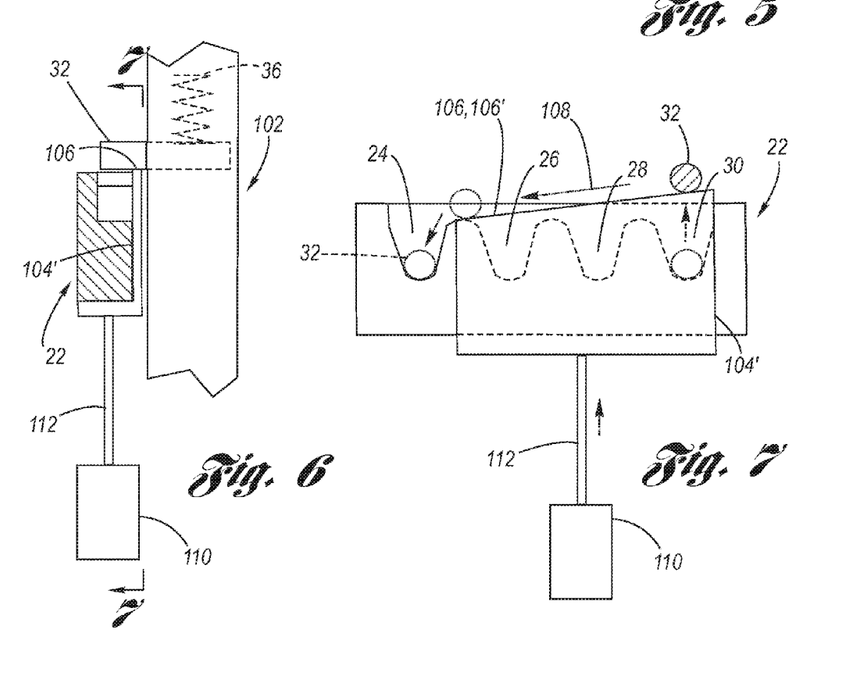
FIG. 6 is a schematic, partly sectional view of a latching shifter with override feature as in FIG. 4, wherein now the park gear synchronization cam is shown at its deployed state.
FIG. 7 is a partly sectional view seen along line 7-7 of FIG. 6.

According to a first aspect of the latching shifter with override feature 100, shown at FIGS. 4 through 7, in a situation in which the driver has selected any gear other than gear "P" 14, as for example gear "R" 16 by placing the shifter at the reverse gear notch 26, gear "N" 18 by placing the shifter at the neutral gear notch 28, gear "D" 20 by placing the shifter at the drive gear notch 30, gear "L" by placing the shifter at the low gear notch (not shown), etc., and the electronics of the transmission, according to its programming, has in fact selected gear "P" (park gear) 14, then a park gear synchronization cam 104' will be autonomously actuated to a deployed state, shown at FIGS. 6 and 7, from a retracted state, shown at FIGS. 4 and 5. At the retracted state, the shifter 102 does not operably interact with the park gear synchronization cam 104', however, when at the deployed state, a cam follower guide surface 106 abuts the cam follower 32 and, against the cam follower biasing provided by the spring 36, lifts the cam follower from the gear notch of the gear it is currently in, shown by way of example the drive gear notch 30 of gear "D" 20. The cam follower guide surface 106 has a singular incline 106' which is raised in position relative to all the various gear notches 16, 18, 20 except with respect to the park gear notch 24 of gear "P" 14 to which the incline has a lowered position (shown best at FIG. 7), such that the cam follower 32, under its inherent biasing by the spring 36, slides along the cam follower guide surface 106. The cam follower guide surface 106 extends across all gear notches 16-20 except the park gear notch 24 of gear "P" 14, wherein the incline 106' has an inclination with respect to the cam follower biasing toward the park gear notch 24 of gear "P" 14 so that the cam follower slides along the cam follower guide surface and then falls into the park gear notch for gear "P". Accordingly, no matter what gear was selected by the driver, the cam follower will slide along the cam follower guide surface, as per arrow 108, physically moving the shifter, so that the cam follower biasingly falls into the park gear notch 24 of gear "P" 14.

An actuator 110 is connected to the park gear synchronization cam 104' via a linkage 112, whereby the actuator effects reciprocal movement of the park gear synchronization cam between the retracted and deployed states. Actuation timing of the actuator is responsive to an electronic control module of the shift-by-wire transmission 200, further discussed with respect to FIG. 12.

Figure 8:
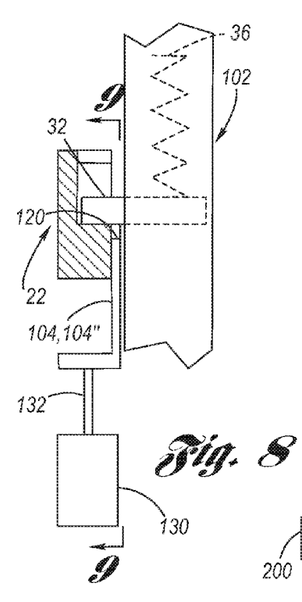
FIG. 8 is a schematic, partly sectional view of a latching shifter with override feature according to a second aspect of the present invention, wherein the neutral gear synchronization cam is shown at its retracted state.
Figure 9:
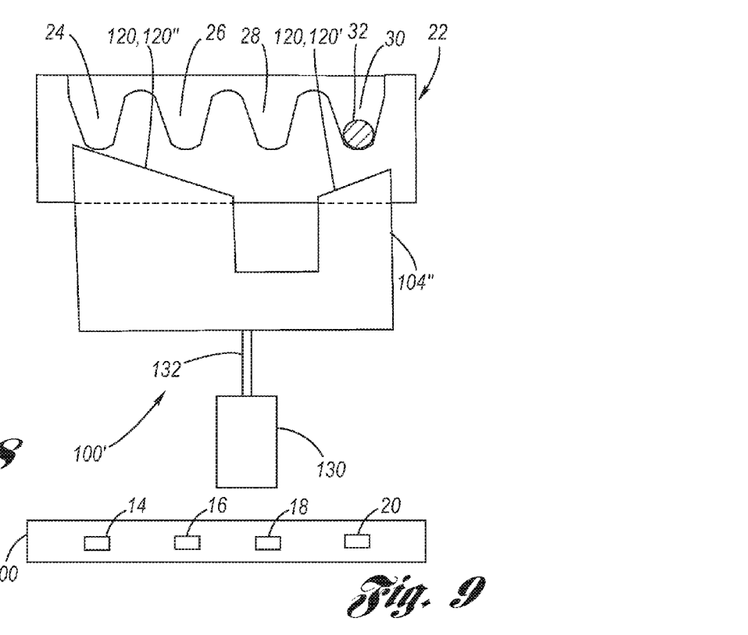
FIG. 9 is a partly sectional view seen along line 9-9 of FIG. 8.
Figure 10:
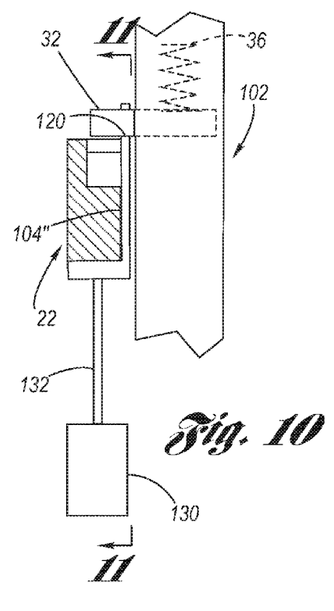
FIG. 10 is a schematic, partly sectional view of a latching shifter with override feature as in FIG. 8, wherein now the neutral gear synchronization cam is shown at its deployed state.
Figure 11:
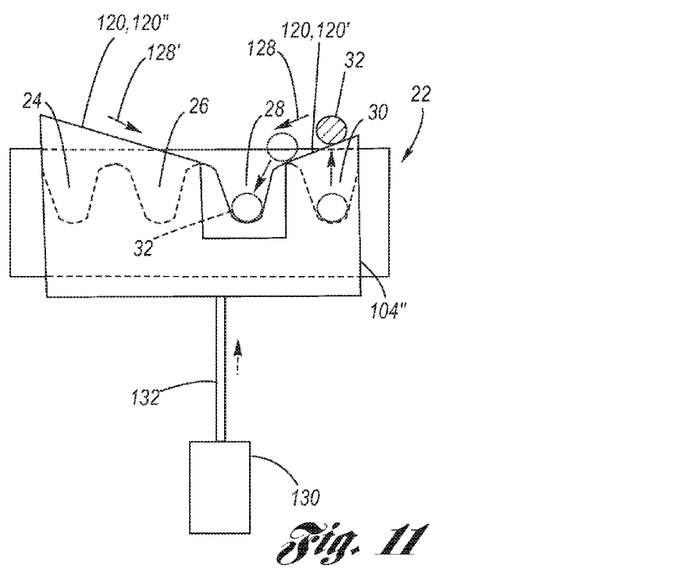
FIG. 11 is a partly sectional view seen along line 11-11 of FIG. 10.

According to a second aspect of the latching shifter with override feature 100', shown at FIGS. 8 through 11, in a situation in which the driver has selected any gear other than gear "N" 18, as for example gear "P" 14 by placing the shifter at the park gear notch 24, gear "R" 16 by placing the shifter at the reverse gear notch 26, gear "D" 20 by placing the shifter at the drive gear notch 30, gear "L" by placing the shifter at the low gear notch (not shown), etc., and the electronics of the transmission, according to its programming, has in fact selected gear "N" (neutral gear), then a neutral gear synchronization cam 104" will be autonomously actuated to a deployed state, shown at FIGS. 10 and 11, from a retracted state, shown at FIGS. 8 and 9. At the retracted state, the shifter 102 does not operably interact with the neutral gear synchronization cam 104", however, when at the deployed state, a cam follower guide surface 120 abuts the cam follower 32 and, against the cam follower biasing provided by the spring 36, lifts the cam follower from the gear notch of the gear it is currently in, shown by way of example drive gear notch 30 of gear "D" 20. The cam follower guide surface 120 has a pair of inclines 120', 120" which are raised in position relative to all the various gear notches 24, 26, 30 except with respect to the neutral gear notch 28 for gear "N" 18, to which the inclines have a lowered position (as best shown at FIG. 11) such that the cam follower 32, under its inherent biasing by the spring 36, slides along the cam follower guide surface 120. The guide cam follower guide surface 120 extends across all gear notches except the neutral gear notch 28 of gear "N" 18, wherein each incline 120', 120" thereof is respectively inclined with regard to the cam follower biasing toward the neutral gear notch 28 of gear "N" 18 so that the cam follower slides along the cam follower guide surface and then falls into the neutral gear notch for gear "N". Accordingly, no matter what gear was selected by the driver, the cam follower 32 will slide along cam follower guide surface 120 (as per arrow 128, or alternatively as per arrow 128' if the cam follower was in gear notches 14, 16 of gears "P" 14 or "R" 16) physically moving the shifter, so that the cam follower biasingly falls into the neutral gear notch 28 of gear "N" 18.

An actuator 130 is connected to the neutral gear synchronization cam 104" via a linkage 132, whereby the actuator effects reciprocal movement of the neutral gear synchronization cam between the retracted and deployed states. Actuation timing of the actuator is responsive to an electronic control module of the shift-by-wire transmission 200, further discussed with respect to FIG. 12.

In either aspect of the present invention, because the gear synchronization cams 104 are autonomously actuated whenever the driver selected gear does not match the gear selected by the electronics of the shift-by-wire transmission 200, as for example gear "N" or gear "P", the physical position of the shifter 102 will always by synchronized to the gear that the transmission is in.

Turning attention now to FIG. 12, both aspects of the latching shifter with override feature 100" are shown in a cooperative environment of operation, wherein like numbers are utilized for like parts as those described above. An electronic control system 150 is provided for operating, singularly or cooperatively, each of the first and second aspects of the latching shifter with override feature 100, 100'.

Now, the gear synchronization cams 104, the park gear synchronization cam 104' and the neutral gear synchronization cam 104" enable the shifter 102 to be biasably moved to either the park gear notch 14 of gear "P" 24 or the neutral gear notch 28 of the gear "N" 28, as recounted hereinabove by appropriate activation of the respective actuator 110, 130.

The control system 150 includes an electronic control module (ECM) 152 which has execution data lines 154, 156 going to the actuators 110, 130, respectively. An electronic gear "P" release 158 is provided which allows the shifter to move in and out of gear positions without need to press the button 38 via execution data line 160. A first sensor 162 senses position of the shifter 102, informing the ECM 152, via data line 164, of the physical position of the shifter. A second sensor 166 senses operative position of the park gear synchronization cam 104', and via data line 168, delivers this information to the ECM 152. A third sensor 170 senses operative position of the neutral gear synchronization cam 104", and via data line 172, delivers this information to the ECM 152.

In operation, if the electronic control module 174 of the shift-by-wire transmission 200 autonomously shifts to a gear, this information is delivered to the ECM 152 via data line 176. The ECM compares this data with the information from the first sensor 162 as to whether the shifter 102 is at the same physical gear notch as that corresponding to the gear the shift-by-wire transmission is in. If not, the ECM then activates the appropriate actuator 110, 130 to effect biasing movement of the shifter to coincide with the gear selection of the electronics of the shift-by-wire transmission. In a first example, if the electronic control module 174 of the shift-by-wire transmission 200 has autonomously selected gear "P" (park gear), but the first sensor 162 indicates the shifter 102 is at a gear notch corresponding to any other gear, then the ECM 152 actuates the actuator 110 so as to move the park gear synchronization cam 104' to the deployed position, wherein when the ECM receives data that the shifter has moved to the park gear notch of gear "P", then the ECM will cause the actuator 110 to return the park gear synchronization cam to its retracted position. In a second example, if the electronic control module 174 of the shift-by-wire transmission 200 has autonomously selected gear "N" (neutral gear), but the first sensor 162 indicates the shifter 102 is at a gear notch corresponding to any other gear, then the ECM 152 actuates the actuator 130 so as to move the neutral gear synchronization cam 104" to the deployed position, wherein when the ECM receives data that the shifter has moved to the neutral gear notch of gear "N", then the ECM will cause the actuator 130 to return the neutral gear synchronization cam to its retracted position.

The autonomous actuation of the gear synchronization cams 104 are electronically monitored by the ECM 152 via the second and third sensors 166, 170, serving as a fault detection system, and any detected fault is electronically signaled by the ECM to the driver, as for example by illumination of a fault warning light 178 via data line 180.

It is seen from the forgoing, that since the shifter is autonomously placed into the gear selected by the electronics of the transmission, any gear selection confusion is avoided. Additionally, because the movement of the shifter when it is being gear synchronized occurs because of spring biasing, untoward abutment (i.e., pinching, bending, crushing, breaking, etc.) of articles adjacent the shifter is avoided. Accordingly, any potential conflicts between the gear selected by the electronics of the transmission and the gear selection physically made by the shifter are resolved.

In closing, it is interesting to briefly discuss the present invention in contrasting relation to the above discussed prior art Jaguar shifter.

With the Jaguar shifter, which utilizes a motor, should the motor malfunction, causing the knob to return to "P" when this is not desired by the driver, the vehicle would become undrivable. By contrast, with the present invention, which utilizes a gear synchronization cam, a malfunction in the cam actuator would cause the shifter to spring to the park gear notch, but the driver would still be able to move the shifter (with higher effort than normal as the cam follower slides along the increasing incline of the cam follower guide surface) to another gear notch, so that, based upon software programming, it is possible under the present invention for the vehicle to still be drivable. Similarly, if a cam malfunction causes the shifter to spring to the neutral gear notch, it is still possible for the driver to select the park gear notch.

Additionally, in the present invention, since the gear synchronization cam moves independently of the shifter, it is possible for the ECM to sense that the gear synchronizing cam is improperly at the deployed state (i.e., due to a cam actuator malfunction). For example, the ECM 152 may sense, by first sensor 162 and third sensor 170 and/or other sensor(s), that the neutral gear synchronizing cam is at the deployed state coincident with the shifter 102 moving to the neutral gear notch. In such a case, the ECM can determine that the driver did not select neutral gear, but rather a malfunction of the neutral gear synchronizing cam has caused the shifter movement to occur. Contrast this with the prior art Jaguar shifter where a rotation of the knob can not be attributed to a driver intent or a motor malfunction Simultaneously, a warning or message may be displayed to the driver to indicate that the gear synchronization cam has malfunctioned and needs to be serviced. Contrast that with the prior art Jaguar shifter, whereby a malfunction of the motor might cause the knob to be stuck in park gear. Also, it may not be possible for an ECM to sense whether the knob rotation into park gear was due to a malfunctioning motor or the result of driver intent, thus failing to provide diagnosis that an error has occurred.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A latching shifter with override feature for a shift-by-wire transmission, comprising:
    a latching shifter comprising:
        a cam follower;
        a gear cam having a plurality of gear notches, one gear notch for each gear of the transmission, respectively; and
        a biasing spring biasing said cam follower into any gear notch of said plurality of gear notches;
    at least one gear synchronization cam having a cam follower guide surface; and
    at least one actuator for moving said at least one gear synchronization cam between a retracted state and a deployed state;
    wherein said plurality of gear notches comprise a park gear notch, a reverse gear notch, a neutral gear notch and a drive gear notch;
    wherein said at least one gear synchronization cam comprises a neutral gear synchronization cam, wherein said at least one actuator comprises a neutral gear synchronization cam actuator, and wherein the cam follower guide surface of said neutral gear synchronization cam comprises a neutral gear cam follower guide surface comprising a pair of neutral gear inclines, each incline of said pair of neutral gear inclines being inclined toward said neutral gear notch;
    wherein at the refracted state of said neutral gear synchronization cam, said neutral gear cam follower guide surface does not abut said cam follower;
    wherein when said neutral gear synchronization cam is moved to the deployed state from the retracted state by actuation of said neutral gear synchronization cam actuator, the neutral gear cam follower guide surface abuts said cam follower such that said cam follower is removed from a gear notch of said plurality of gear notches other than said neutral gear notch and the biasing by said biasing spring in combination with said pair of neutral gear inclines causes said cam follower to slide along said neutral gear cam follower guide surface and be placed into said neutral gear notch; wherein when the neutral gear synchronization cam is moved to the deployed state from the retracted state, if said cam follower is in said reverse gear notch then one incline of said pair of inclines places said cam follower into said neutral gear notch and if said cam follower is in said drive gear notch then the other incline of said pair of inclines places said cam follower into said neutral gear notch;
    wherein said at least one gear synchronization cam further comprises a park gear synchronization cam, wherein said at least one actuator further comprises a park gear synchronization cam actuator, and wherein the cam follower guide surface of said park gear synchronization cam comprises a park gear cam follower guide surface comprising a park gear incline, said park gear incline being inclined toward said park gear notch;
    wherein at the refracted state of said park gear synchronization cam, said park gear cam follower guide surface does not abut said cam follower; and
    wherein when said park gear synchronization cam is at the deployed state by actuation of said park gear synchronization cam actuator, the park gear cam follower guide surface abuts said cam follower such that said cam follower is removed from any gear notch of said plurality of gear notches other than said park gear notch and the biasing by said biasing spring in combination with said park gear incline causes said cam follower to slide along said park gear cam follower guide surface and be placed into said park gear notch.

2. A latching shifter with override feature and shift-by-wire transmission combination, comprising:
    a latching shifter comprising:
        a cam follower;
        a gear cam having a plurality of gear notches, one gear notch for each gear of the transmission, respectively; and
        a biasing spring biasing said cam follower into any gear notch of said plurality of gear notches;
    at least one gear synchronization cam having a cam follower guide surface;
    at least one actuator for moving said at least one gear synchronization cam between a retracted state and a deployed state;
    a shift-by-wire transmission comprising:
        a plurality of gears comprising a park gear, a reverse gear, a neutral gear; and a drive gear, wherein said plurality of gear notches comprise a park gear notch corresponding to selection by said latching shifter of said park gear, a reverse gear notch corresponding to selection by said latching shifter of said reverse gear, a neutral gear notch corresponding to selection by said latching shifter of said neutral gear, and a drive gear notch corresponding to selection by said latching shifter of said drive gear; and
        transmission electronics providing autonomous shifting of said gears of said transmission independent of said latching shifter; and
    wherein said at least one gear synchronization cam comprises a neutral gear synchronization cam, wherein said at least one actuator comprises a neutral gear synchronization cam actuator, and wherein the cam follower guide surface of said neutral gear synchronization cam comprises a neutral gear cam follower guide surface comprising a pair of neutral gear inclines, each incline of said pair of neutral gear inclines being inclined toward said neutral gear notch;
    wherein at the refracted state of said neutral gear synchronization cam, said neutral gear cam follower guide surface does not abut said cam follower;
    wherein when said neutral gear synchronization cam is moved to the deployed state from the retracted state by actuation of said neutral gear synchronization cam actuator, the neutral gear cam follower guide surface abuts said cam follower such that said cam follower is removed from a gear notch of said plurality of gear notches other than said neutral gear notch and the biasing by said biasing spring in combination with said pair of neutral gear inclines causes said cam follower to slide along said neutral gear cam follower guide surface and be placed into said neutral gear notch; wherein when the neutral gear synchronization cam is moved to the deployed state from the retracted state, if said cam follower is in said reverse gear notch then one incline of said pair of inclines places said cam follower into said neutral gear notch and if said cam follower is in said drive gear notch then the other incline of said pair of inclines places said cam follower into said neutral gear notch;

wherein said at least one gear synchronization cam further comprises a park gear synchronization cam, wherein said at least one actuator further comprises a park gear synchronization cam actuator, and wherein the cam follower guide surface of said park gear synchronization cam comprises a park gear cam follower guide surface comprising a park gear incline, said park gear incline being inclined toward said park gear notch;

wherein at the refracted state of said neutral gear synchronization cam, said neutral gear cam follower guide surface does not abut said cam follower; and wherein when said park gear synchronization cam is at the deployed state by actuation of the park gear synchronization cam actuator, the park gear cam follower guide surface abuts said cam follower such that said cam follower is removed from any gear notch of said plurality of gear notches other than said park gear notch and the biasing by said biasing spring in combination with said park gear incline causes said cam follower to slide along said park gear cam follower guide surface and be placed into said park gear notch.

3. The combination of claim 2, further comprising an electronic control module interfaced with said transmission electronics and said neutral gear synchronization cam actuator;

wherein said electronic control module actuates said neutral gear synchronization cam actuator to move said neutral gear synchronization cam to the deployed state responsive to said electronics of said transmission placing said transmission in a gear other than a gear selected by said latching shifter.

4. The combination of claim 3, further comprising fault detection system which detects fault in movement of said neutral gear synchronization cam responsive to actuation of said neutral gear synchronization cam actuator by said electronic control module.

* * * * *